(12) United States Patent
Jung (10) Patent No.: US 11,324,348 B1
(45) Date of Patent: May 10, 2022

(54) FLOOR MAT WITH IMPROVED RIGIDITY AND NON-SLIP BACKING

(71) Applicant: BDK USA, INC., Carson, CA (US)

(72) Inventor: Yoojin Jung, Palos Verdes, CA (US)

( * ) Notice: Subject to any disclaimer, the term of this patent is extended or adjusted under 35 U.S.C. 154(b) by 0 days.

(21) Appl. No.: 17/075,054

(22) Filed: Oct. 20, 2020

(51) Int. Cl.
*A47G 27/00* (2006.01)
*A47G 27/02* (2006.01)

(52) U.S. Cl.
CPC ..... *A47G 27/0281* (2013.01); *A47G 27/0206* (2013.01); *Y10T 428/2457* (2015.01)

(58) Field of Classification Search
None
See application file for complete search history.

(56) References Cited

U.S. PATENT DOCUMENTS

2010/0055382 A1\* 3/2010 Hatta ...................... B32B 3/266
428/95

\* cited by examiner

*Primary Examiner* — Alexander S Thomas
(74) *Attorney, Agent, or Firm* — Ahn IP Law

(57) ABSTRACT

A floor mat with improved rigidity and non-slip surfaces is disclosed. The floor mat includes a bottom surface with an interior cavity that has within it a plurality of interior walls that intersect with one another, thereby increasing rigidity of the floor mat. The floor mat also includes a plurality of nubs at the intersections of the interior walls that increase friction with the flooring of an automobile, thereby improving the non-slip characteristics of the floor mat.

19 Claims, 10 Drawing Sheets

FLOOR MAT WITH IMPROVED RIGIDITY AND NON-SLIP BACKING

BACKGROUND

Field

Embodiments are related in general to floor mats and, in particular, protective floor mats with improved rigidity and non-slip backing for use in automobiles.

Description of Related Art

Protective floor mats are generally used in automobiles to protect the interior carpeted surface of an automobile, such as the carpeted flooring. The floor mats are placed on top of a carpeted surface on the floor of the automobile to protect the carpeted floor surface from stains, dirt, and wear. Some protective floor mats known in the art have the tendency to bend or curl over time after normal use due to their lack of rigidity. Bending or curling of the protective floor mat is a potential problem that may present a hazard for the driver of the automobile if any portion of the protective floor mat obstructs a brake pedal or accelerator of the automobile. Some protective floor mats known in the art have the tendency to slip or slide laterally on top of the floor of an automobile. Sliding of the protective floor mat, especially if it also has a tendency to bend or curl, could obstruct the brake pedal or accelerator.

SUMMARY OF THE INVENTION

Presented herein is an improved protective floor mat, and in particular, a protective floor mat for use in automobiles. The present invention relates to a protective floor mat with increased rigidity to prevent bending or curling of the floor mat. The present invention also includes a non-slip surface or backing to prevent the floor mat from laterally sliding or shifting from its intended position.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

Several embodiments with reference to the appended drawings are now explained. Whenever the shapes, relative positions and other aspects of the parts described in the embodiments are not clearly defined, the scope of embodiments is not limited only to the parts shown, which are meant merely for the purpose of illustration. Also, while numerous details are set forth, it is understood that some embodiments may be practiced without these details.

Figure 1:
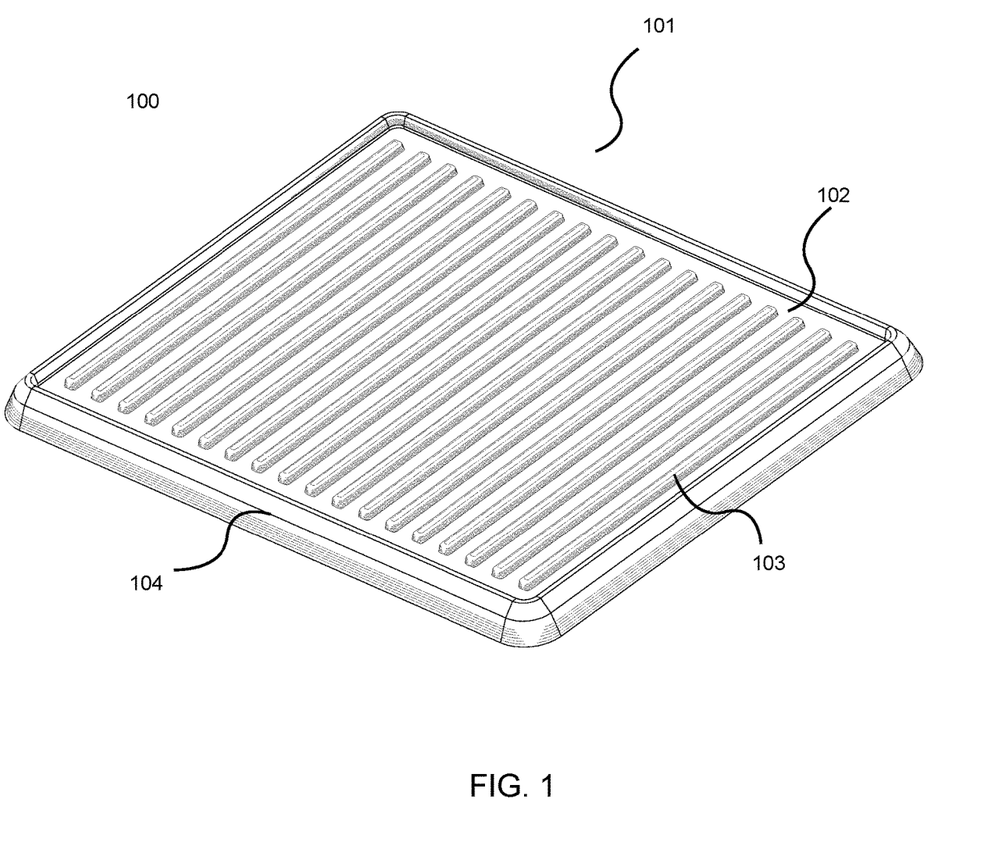
FIG. 1 shows a perspective view of a top surface of a floor mat according to an embodiment of an invention.

FIG. 1 is a perspective view of a floor mat 100. The floor mat 100 is preferably formed in a rectangular or square planar shape, but it may be generally formed in any appropriate planar shape suitable for use as an automobile floor mat. The floor mat 100 includes a top surface 101 that may optionally include a friction surface 102. The friction surface 102 may include a series of ridges, lines, bumps, nubs, or the like, to increase friction of the top surface 101 so that a driver who steps on the floor mat 100 does not slip. In the embodiment shown in FIG. 1, the friction surface 102 includes a series of raised linear lines 103 that are parallel to each other. In this embodiment, an outer border 104 of the top surface 101 of the floor mat 100 surrounds the friction surface 102.

Figure 2:
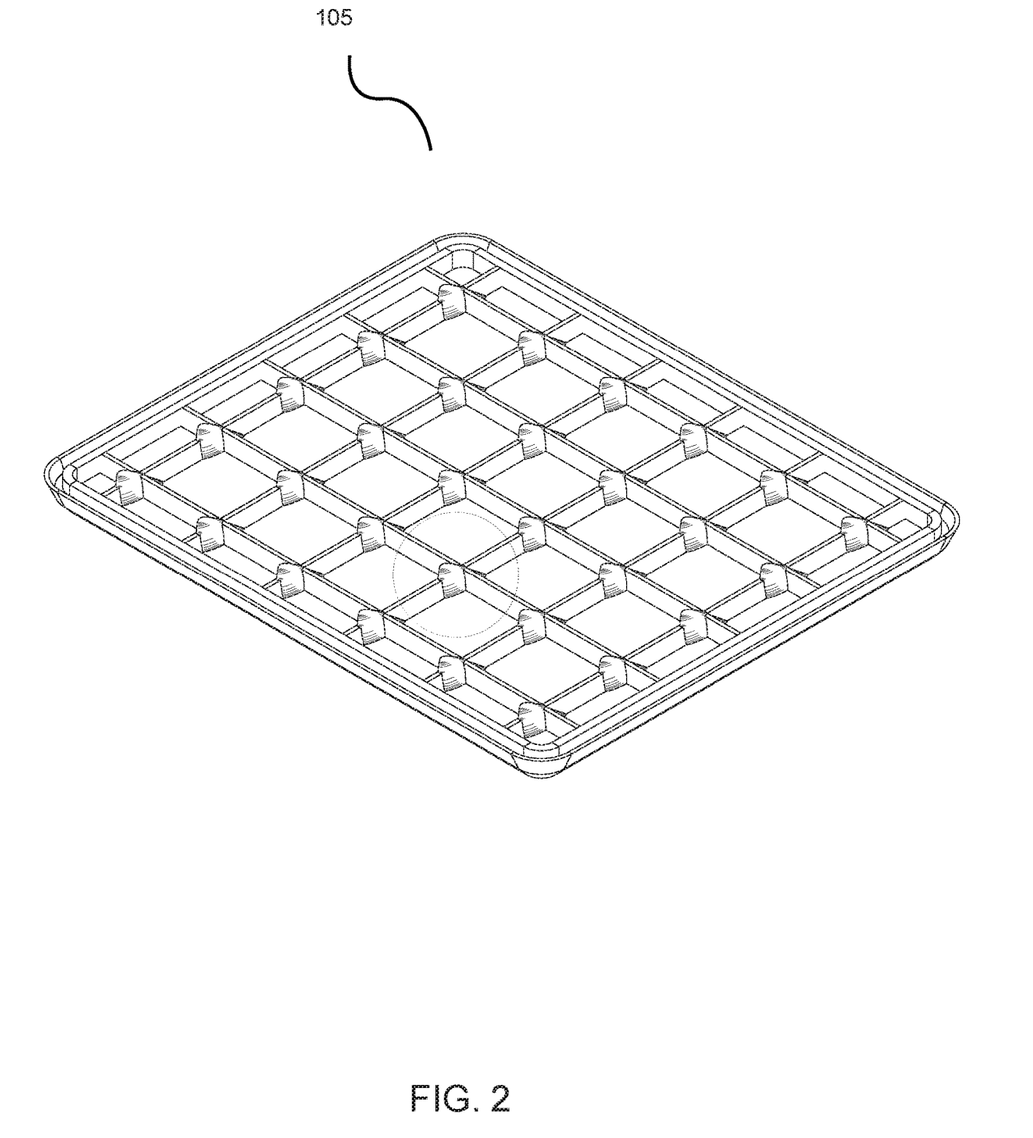
FIG. 2 is a perspective view of a bottom surface the floor mat shown in FIG. 1 in an upside-down position.
Figure 3:
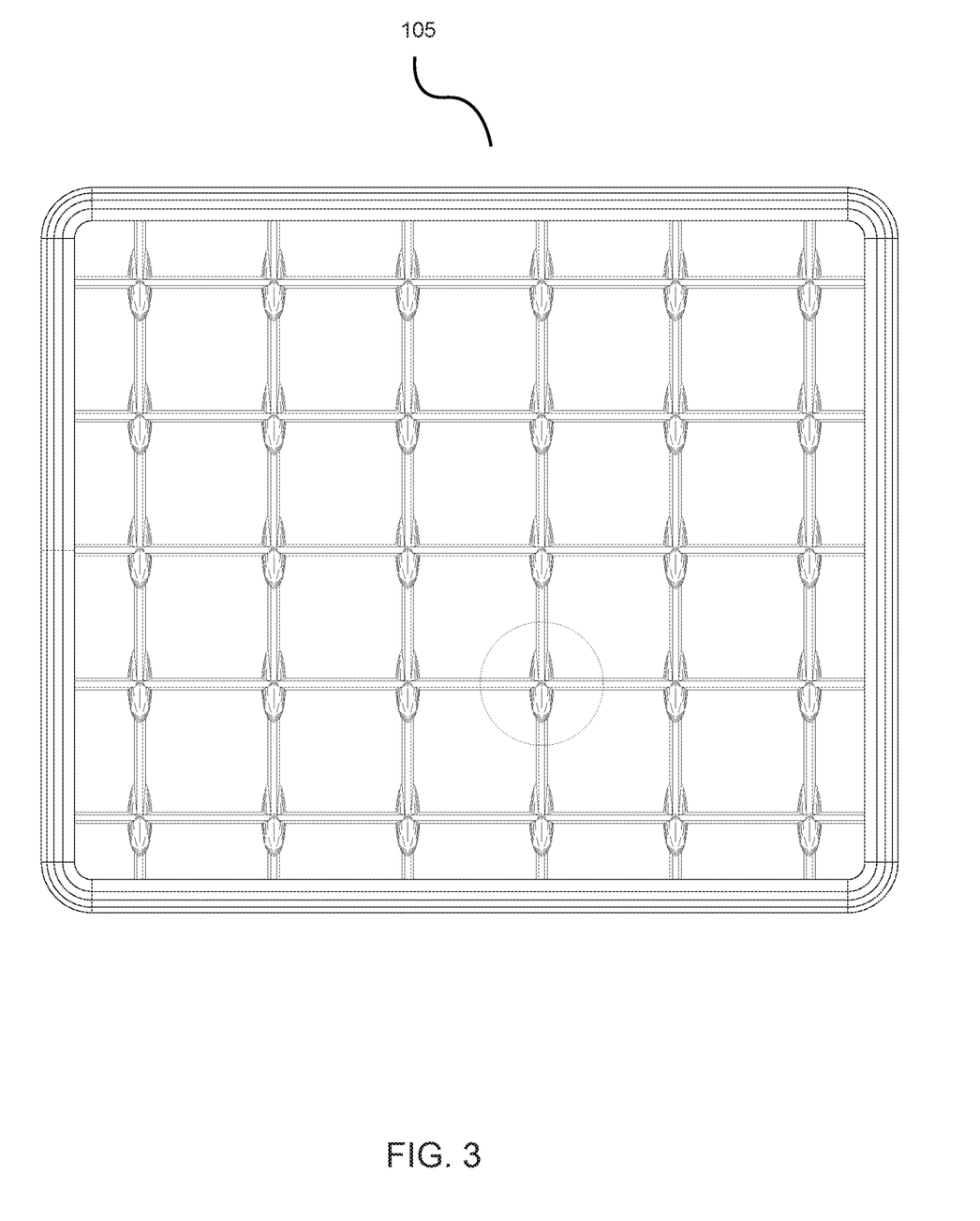
FIG. 3 is a top view of the bottom surface of the floor mat shown in FIG. 1 in an upside-down position.
Figure 4:
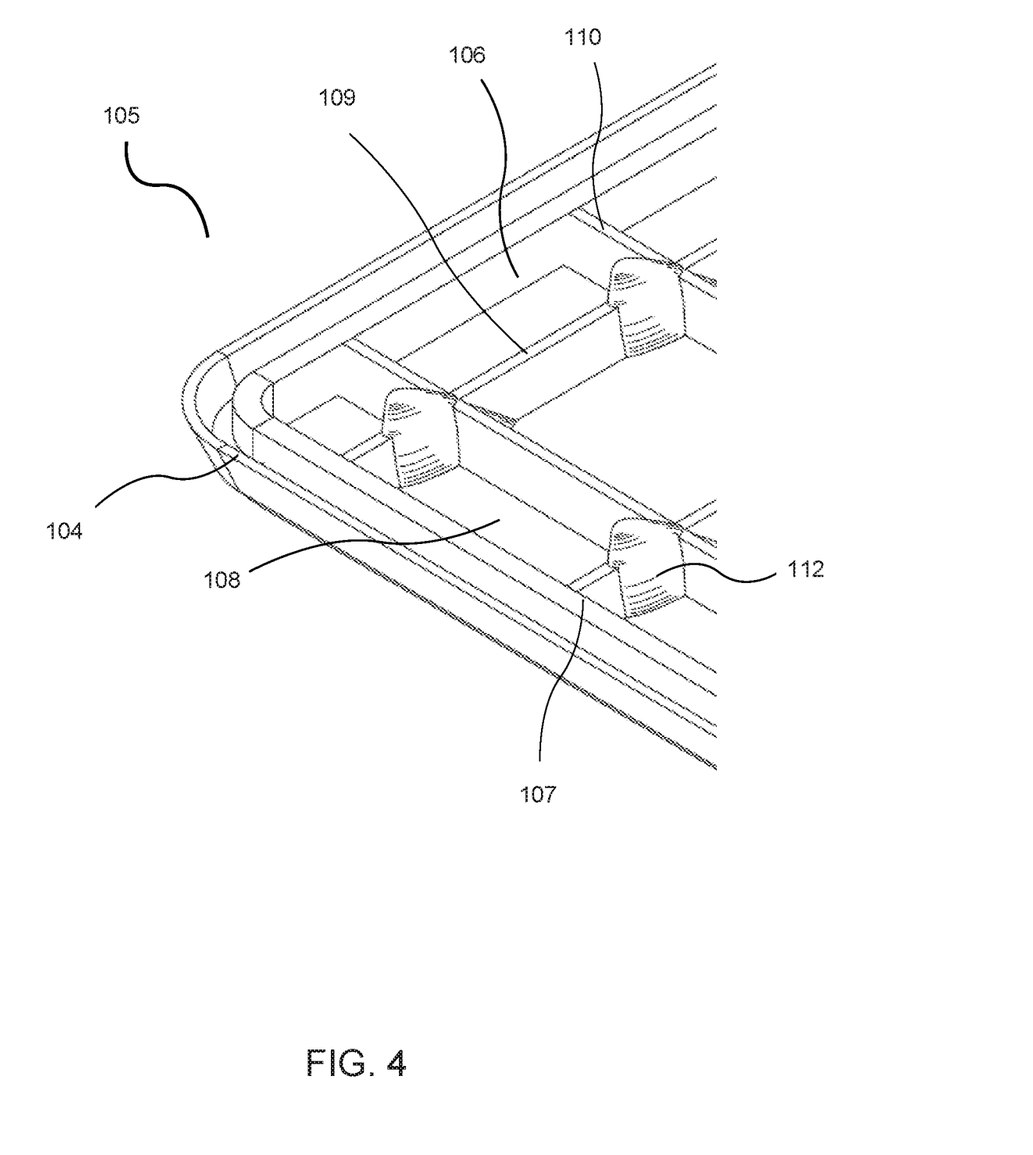
FIG. 4 shows a magnified perspective view of the bottom surface of the floor mat shown in FIG. 2.

FIG. 2 is a perspective view of a bottom surface 105 of the floor mat 100 shown in FIG. 1 in an upside-down position. FIG. 3 is a top view of the bottom surface 105 of the floor mat 100 shown in FIG. 1 in an upside-down position. FIG. 4 shows a magnified perspective view of the bottom surface 105 of the floor mat 100 shown in FIG. 2. The bottom surface 105 includes an interior cavity 106 that is defined by a surrounding wall 107 and an interior base surface 108. Within the interior cavity 106, a first set of a plurality of interior walls 109 extends from one end of the surrounding wall 107 to the other end and extends vertically from the interior base surface 108. In this embodiment, the first set of the plurality of interior walls 109 are parallel to each other. A second set of a plurality of interior walls 110 extends from one end of the surrounding wall 107 to the other end and extends vertically from the interior base surface 108. The second set of the plurality of interior walls 110 are parallel to each other. The first set of the plurality of interior walls 109 intersect with the second set of the plurality of interior walls 110 at a plurality of intersections 111. In this embodiment, the first set of the plurality of interior walls 109 perpendicularly intersects with the second set of the plurality of interior walls 110 at 90 degree angles. In another embodiment, the first set of the plurality of interior walls 109 and the second set of the plurality of interior walls 110 may intersect at greater than or less than 90 degrees.

Figure 5:
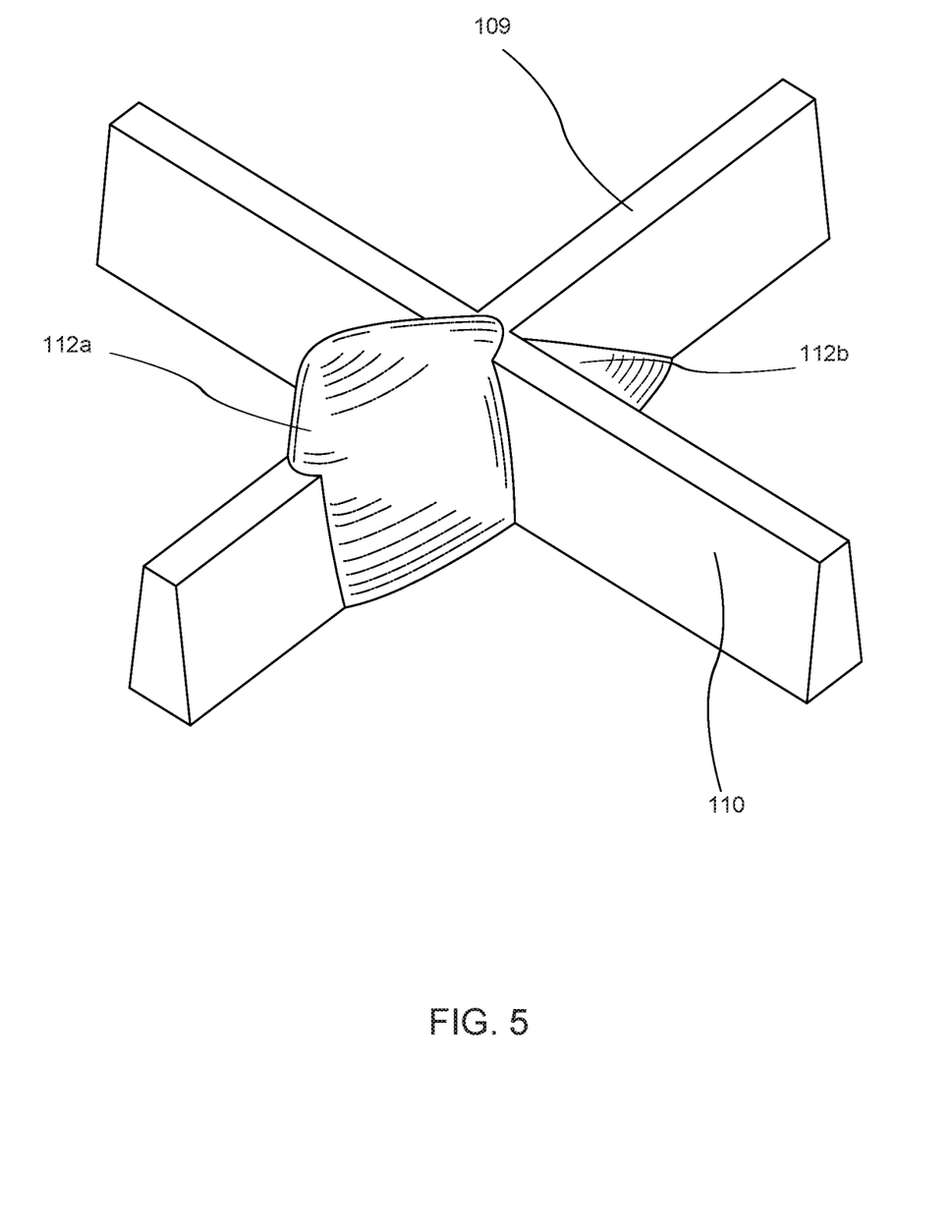
FIG. 5 shows a magnified front perspective view of one of the plurality of intersections.
Figure 6:
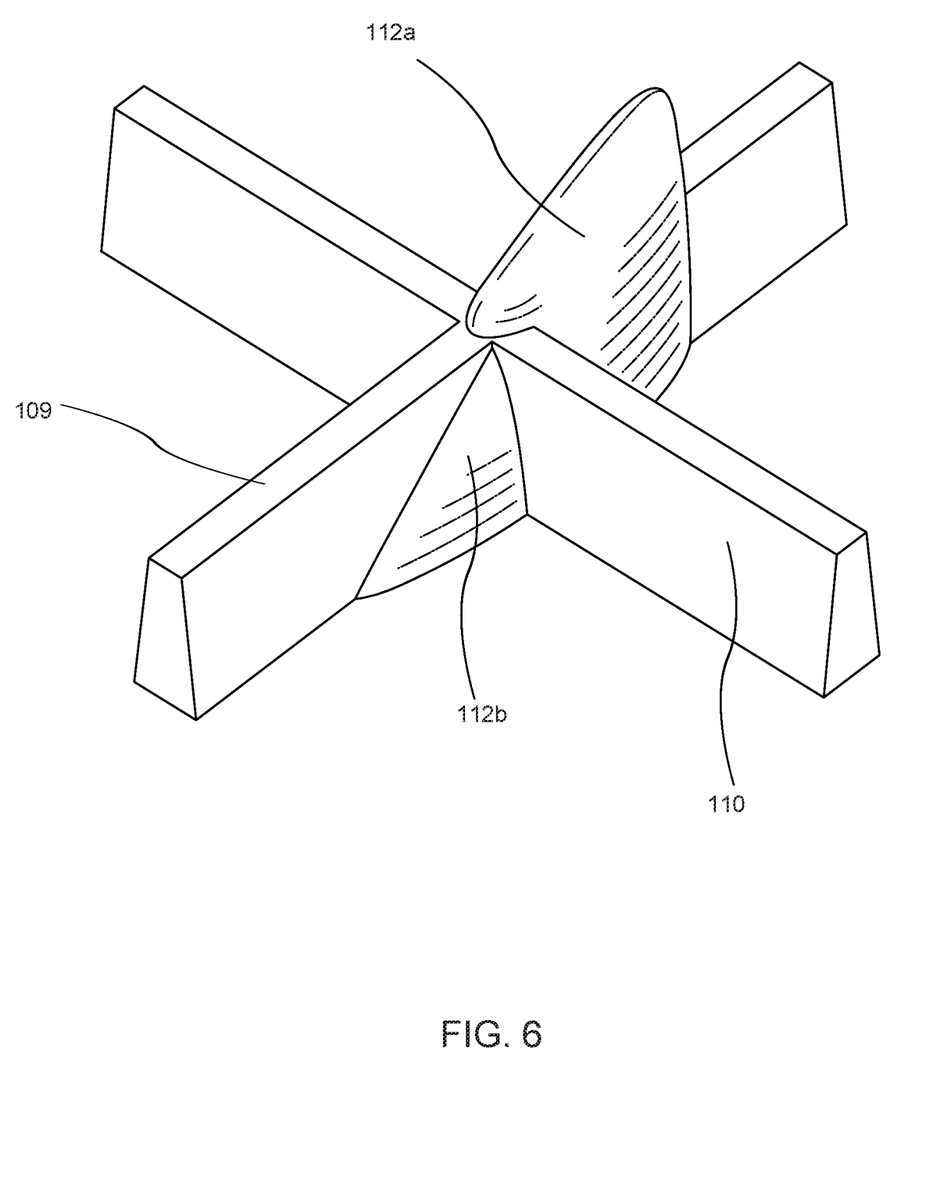
FIG. 6 shows a magnified rear perspective view of the one of the plurality of intersections.

FIG. 5 shows a magnified front perspective view of one of the plurality of intersections 111, which is a close-up view of one of the intersections 111 in FIG. 2 (shown in a circle in broken lines). FIG. 6 shows a magnified rear perspective view of the one of the plurality of intersections 111. In this embodiment, a one of a plurality of nubs 112 are positioned at each one of the plurality of intersections 111. In another embodiment, some intersections 111 may lack a nub 112. In this embodiment, each one of the plurality of nubs 112 may have an overall shape of an angled tooth. The nub 112 may include a long nub portion 112a and a short nub portion 112b as shown in FIGS. 5 and 6. The long nub portion 112a may extend from the interior ceiling 108 and beyond a height of one of the first set of the plurality of interior walls 109. As shown in FIGS. 5 and 6, the first set of the plurality of interior walls 109 and the second set of the plurality of interior walls 110 have greater width at the base of the wall relative to the width at the top of the wall.

Figure 7:
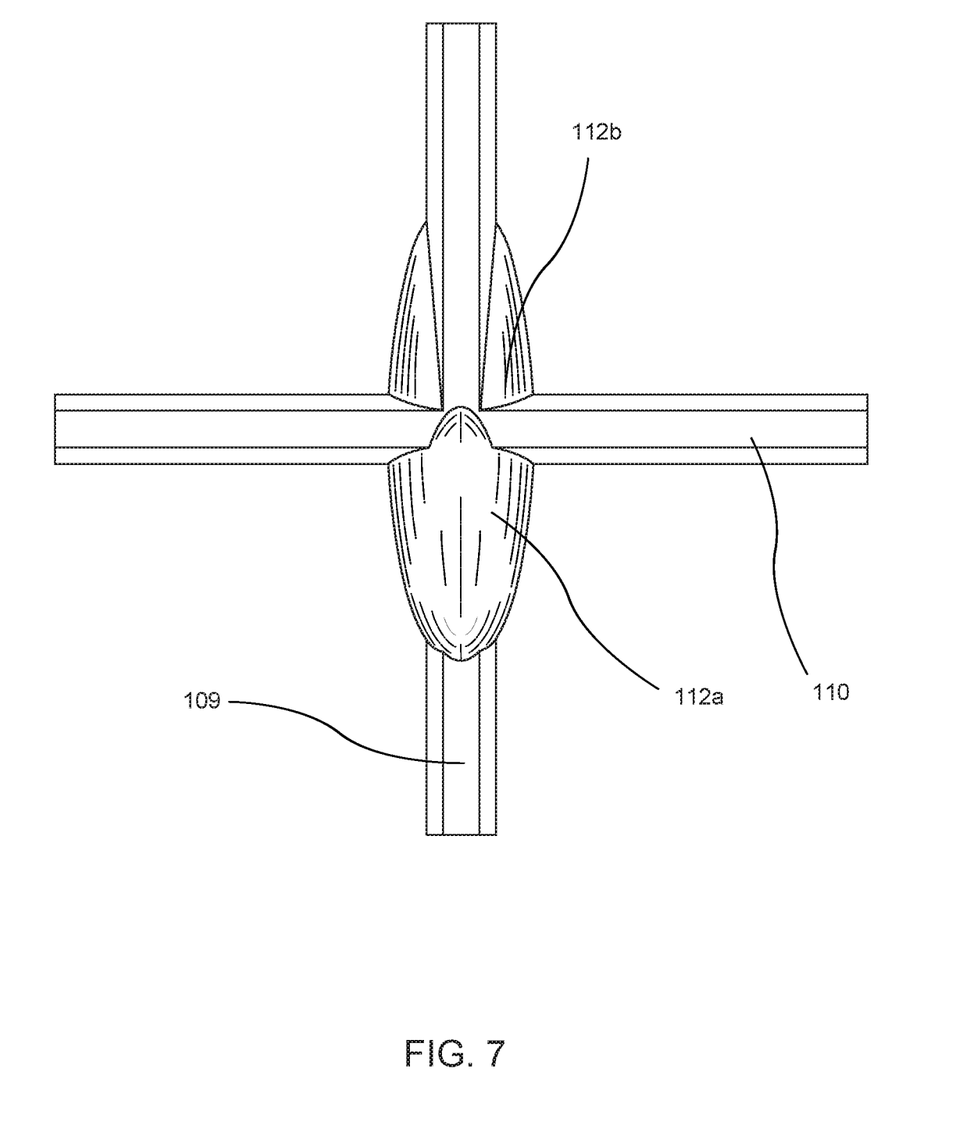
FIG. 7 shows a magnified top view of one of the plurality of intersections.
Figure 8:
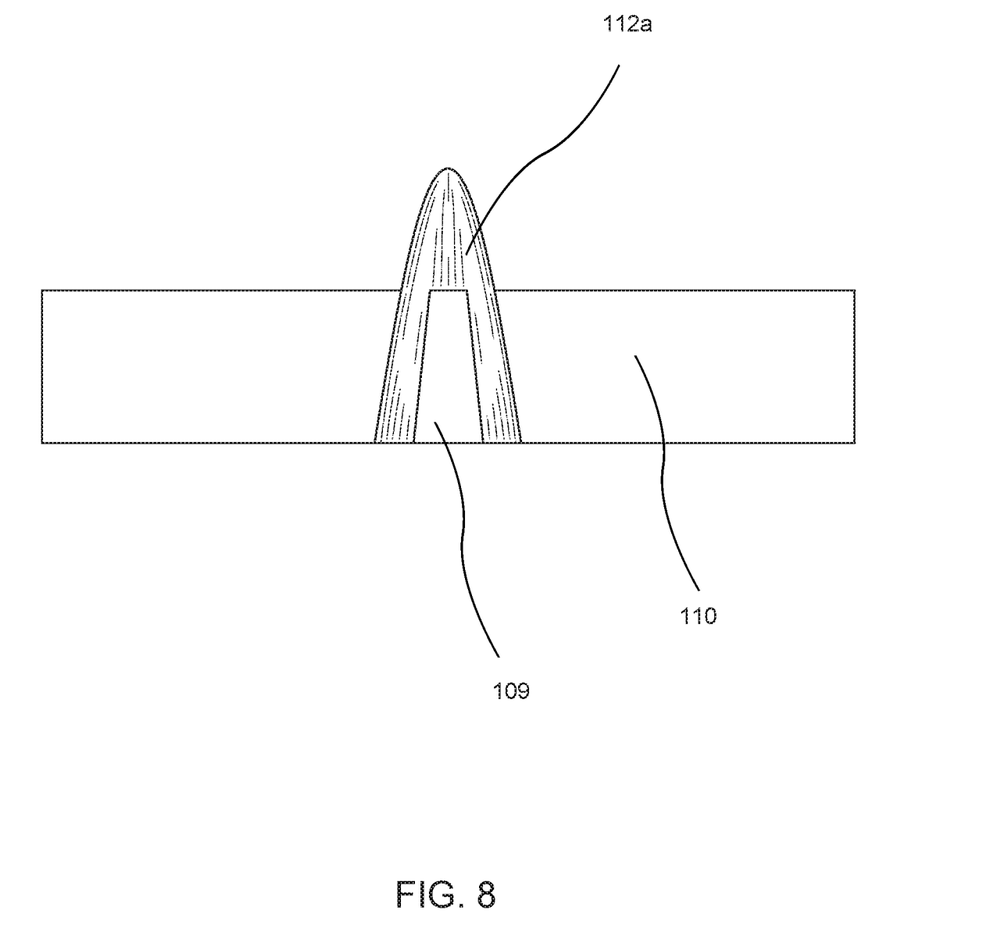
FIG. 8 shows a magnified front view of one of the plurality of intersections.
Figure 9:
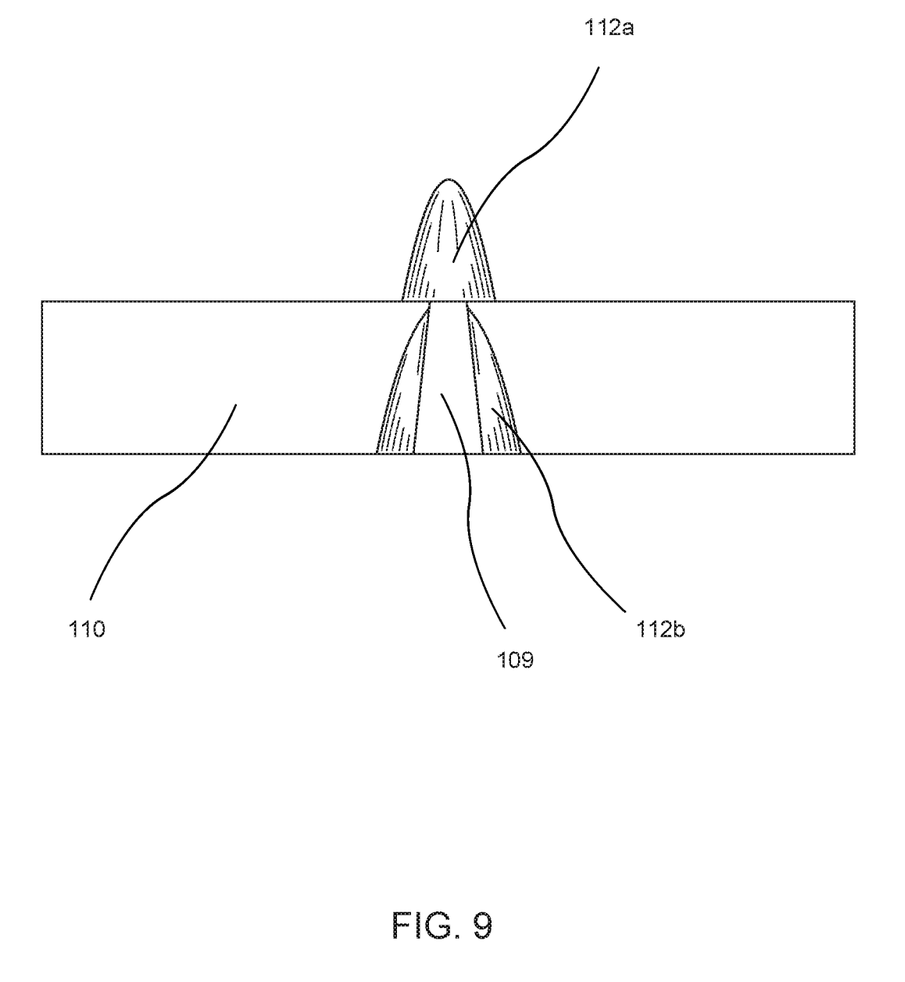
FIG. 9 shows a magnified rear view of one of the plurality of intersections.
Figure 10:
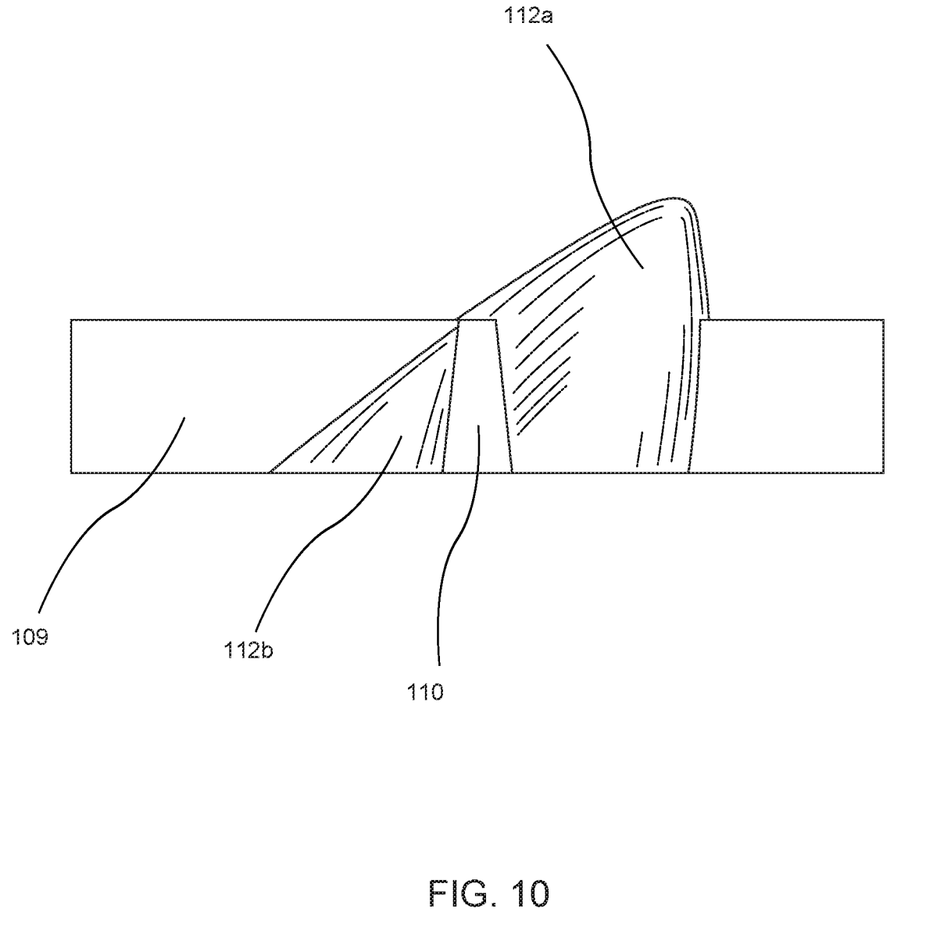
FIG. 10 shows a magnified side view of one of the plurality of intersections.

FIG. 7 shows a magnified top view of one of the plurality of intersections 111. FIG. 8 shows a magnified front view of one of the plurality of intersections 111. As shown in FIGS. 7 and 8, the long nub portion 112a may have a contour shape of an angled tooth that extends beyond the thickness of a width of the interior wall 109. FIG. 9 shows a magnified rear view of one of the plurality of intersections 111. As shown in FIG. 9, the short nub portion 112b may also have a contour shape of a bottom portion of the angled tooth that extends beyond the thickness of the width of the interior wall 109. In this embodiment, the short nub portion 112b may extend from the interior ceiling 108, but not beyond the height of one of the plurality of interior walls 109. FIG. 10 shows a magnified side view of one of the plurality of intersections 111. As shown in FIG. 10, one of the second set of the plurality of interior walls 110 may be positioned in between the long nub portion 112a and the short nub portion 112b. The long nub portion 112a and the short nub portion 112b may be separated by one of the second set of the plurality of interior walls 110.

In one embodiment, the plurality of nubs 112 may be on the same plane or common plane as the first set of the plurality of interior walls 109. Just as the first set of the plurality of interior walls 109 are parallel to each other, the plurality of nubs 112 may be parallel to each other as well. In another embodiment, the plurality of nubs 112 may be on the same plane or common plane as the second set of the plurality of interior walls 110.

The plurality of nubs 112 may be asymmetrically shaped. In this embodiment, the plurality of nubs 112 may have the shape of an angled tooth. In another embodiment, the plurality of nubs 112 may be symmetrically shaped in a straight tooth configuration. The shape of the plurality of nubs 112 may vary widely, as long as they may provide sufficient friction when in contact with the floor of the automobile so that the floor mat 100 does not slip or shift from its intended position. For example, the plurality of nubs 112 may be cylinders, a series of loops, hooks, or cleats.

As shown in FIG. 2, the plurality of nubs 112 may extend beyond a height of the outer border 104 and a height of the surrounding wall 107. In FIG. 2, the height of the outer border 104 and the height of the surrounding wall 107 may be the same height. This may further increase friction in situations where the floor mat 100 is placed on carpeted flooring of an automobile because it allows the plurality of nubs 112 to dig deeper into the carpeting flooring. In one embodiment, the surrounding wall 107 may extend below the height of the outer border 104. In another embodiment, the surrounding wall 107 does not extend below the height of the outer border 104.

In one embodiment, the floor mat 100 may be made of rubber polymer, vinyl polymer, PVC, polyurethane, foam rubber, recycled rubber, natural rubber, synthetic rubber, silicone, thermoplastics, and other polymers. In a preferred embodiment, the floormat 100 may be made through injection molding techniques as known in the art.

The above description of illustrated implementations, including what is described in the Abstract, is not intended to be exhaustive or to limit the embodiments of invention to the precise forms disclosed. While specific implementations of, and examples for, embodiments of the invention are described herein for illustrative purposes, various equivalent modifications are possible within the scope, as those skilled in the relevant art will recognize. These modifications may be made to embodiments of the invention in light of the above detailed description.

The terms used in the following claims should not be construed to limit embodiments of the invention to the specific implementations disclosed in the specification and the claims. Rather, the scope is to be determined entirely by the following claims, which are to be construed in accordance with established doctrines of claim interpretation.

The invention claimed is:

1. A floor mat comprising:
   a top surface;
   a bottom surface having an interior cavity defined by a surrounding wall and an interior base surface;
   a first set of a plurality of interior walls that extend from the interior base surface and positioned within the interior cavity;
   a second set of a plurality of interior walls that extend from the interior base surface and positioned within the interior cavity; and
   a plurality of nubs;
   wherein one of the first set of the plurality of interior walls intersects with one of the second set of the plurality of interior walls at an intersection;
   wherein one of the plurality of nubs is positioned at the intersection; and
   wherein one of the plurality of nubs is shaped as an asymmetrically angled tooth.

2. The apparatus of claim 1, wherein the first set of the plurality of interior walls are parallel to each other and the second set of the plurality of interior walls are parallel to each other.

3. The apparatus of claim 2, wherein the first set of the plurality of interior walls intersect with the second set of the plurality of interior walls at a plurality of intersections.

4. The apparatus of claim 3, wherein each one of the plurality of intersections has one of the plurality of nubs.

5. The apparatus of claim 4, wherein the first set of the plurality of interior walls intersect with the second set of the plurality of interior walls at 90 degree angles.

6. The apparatus of claim 4, wherein each one of the plurality of nubs are on a common plane as one of the first set of the plurality of interior walls.

7. The apparatus of claim 4, wherein each one of the plurality of nubs are on a common plane as one of the second set of the plurality of interior walls.

8. The apparatus of claim 1, wherein the plurality of nubs extend beyond a height of the surrounding wall.

9. The apparatus of claim 1, wherein each one of the plurality of nubs are shaped as an asymmetrically angled tooth.

10. A floor mat comprising:
    a top surface;
    a bottom surface having an interior cavity defined by a surrounding wall and an interior base surface;
    a first set of a plurality of interior walls that extend from the interior base surface and positioned within the interior cavity;
    a second set of a plurality of interior walls that extend from the interior base surface and positioned within the interior cavity; and
    a plurality of nubs;
    wherein one of the first set of the plurality of interior walls intersects with one of the second set of the plurality of interior walls at an intersection;
    wherein one of the plurality of nubs is positioned at the intersection; and wherein one of the plurality of nubs comprises:
   a long nub portion that extends beyond a height of one of the first set of the plurality of interior walls; and
   a short nub portion that does not extend beyond a height of one of the first set of the plurality of interior walls.

11. The apparatus of claim 10, wherein the long nub portion and the short nub portion are separated by one of the second set of the plurality of interior walls.

12. The apparatus of claim 11, wherein the first set of the plurality of interior walls intersect with the second set of the plurality of interior walls at a plurality of intersections.

13. The apparatus of claim 10, wherein one of the plurality of nubs is shaped as an asymmetrically angled tooth.

14. The apparatus of claim 13, wherein each one of the plurality of intersections has one of the plurality of nubs.

15. The apparatus of claim 14, wherein the first set of the plurality of interior walls intersect with the second set of the plurality of interior walls at 90 degree angles.

16. The apparatus of claim 14, wherein each one of the plurality of nubs are on a common plane as one of the first set of the plurality of interior walls.

17. The apparatus of claim 14, wherein each one of the plurality of nubs are on a common plane as one of the second set of the plurality of interior walls.

18. The apparatus of claim 10, wherein the first set of the plurality of interior walls are parallel to each other and the second set of the plurality of interior walls are parallel to each other.

19. The apparatus of claim 10, wherein one of the plurality of nubs is shaped as a straight tooth.

* * * * *